C. JOICE.
PLUMB BOB.
APPLICATION FILED APR. 19, 1910.
995,872.
Patented June 20, 1911.
Fig. 1.
Fig. 2.
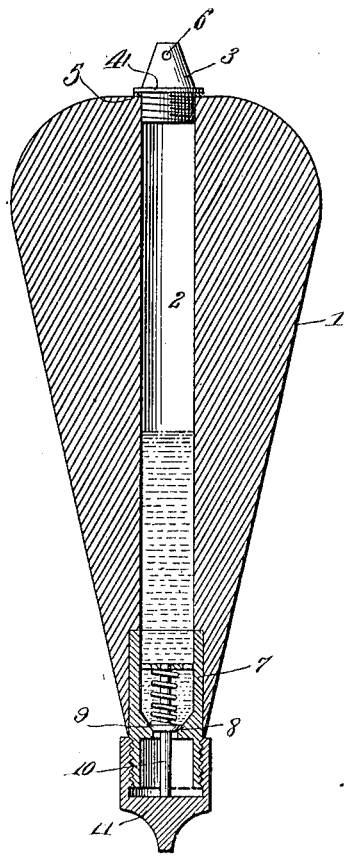
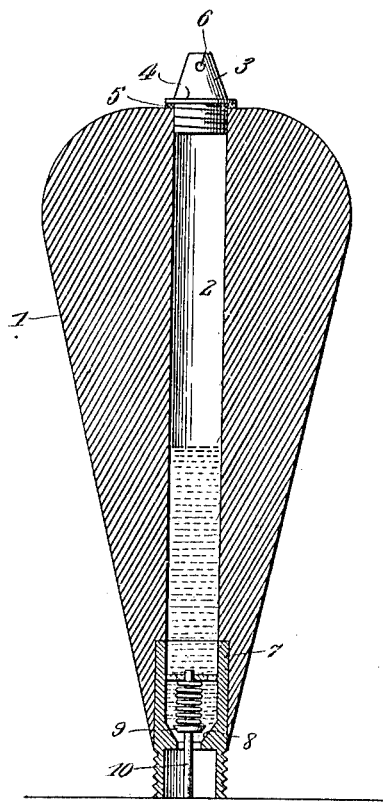
Witnesses
J. C. Crawford.
James A. Koehl
Inventor
Chesley Joice,
By Victor J. Evans
Attorney
THE NORRIS PETERS CO., WASHINGTON, D. C.

UNITED STATES PATENT OFFICE.

CHESLEY JOICE, OF HOLLISTER, CALIFORNIA.

PLUMB-BOB.

995,872.   Specification of Letters Patent.   Patented June 20, 1911.

Application filed April 19, 1910. Serial No. 556,297.

*To all whom it may concern:*

Be it known that I, CHESLEY JOICE, a citizen of the United States of America, residing at Hollister, in the county of San Benito and State of California, have invented new and useful Improvements in Plumb-Bobs, of which the following is a specification.

This invention relates to plumb bobs, and it has for an object to provide a device of this character employing an automatic marking attachment which operates to indicate the point at which the line has been set.

In the drawing, forming a portion of this specification and in which like numerals of reference indicate similar parts in the several views:—Figure 1 is a vertical section through my improved plumb bob. Fig. 2 is a similar view showing the plumb bob with the cap removed.

My improved plumb bob consists of a substantially conical member 1 in which is formed a chamber or reservoir 2 for the reception of the marking fluid. This chamber is closed at the upper end of the plumb bob by means of a screw plug 3 which is formed to provide a shoulder 4 against which is seated a gasket 5. The said plug is formed to provide an apertured portion 6 for receiving one end of the plumb line.

The lower end of the plumb bob carries a valve member 7 which is formed to provide a seat 8 against which the spring tension valve 9 is normally engaged. This valve is provided with a stem 10 whose lower extremity extends below the valve member so as to be actuated automatically when the plumb bob is in its lowered position. When the stem of the valve is moved inwardly, incident to its engagement against the surface upon which the plumb bob is dropped or set, the valve will be moved to an open position permitting a quantity of the marking fluid to be discharged upon the surface as will be understood. The valve member is threaded exteriorly for the reception of an interiorly threaded cap 11. When the cap 11 is engaged with the valve member the plumb bob may be used as in the ordinary manner.

The article herein described and shown is extremely simple in construction and the operator will be able to readily ascertain at which point the plumb bob has been set. The marking fluid may be ink, or if desired I may resort to the use of powder or other such substance as will serve as a designating means.

I claim:—

A plumb bob comprising a member formed with a central bore, a plug closing one end of the bore and detachably engaged therein, the bore being enlarged at its opposite end, a member fitted in the enlarged end of the bore and constructed to form a valve seat, the said member having an outwardly extended hollow threaded portion, the said member having an opening establishing communication between the opening in the hollow threaded portion of the second named member and the bore of the first named member, a spring controlled valve movably mounted in the second named member, the spring operating to normally hold the valve against the said seat to close the opening in the said second named member, a stem extending through the hollow threaded portion of the said second named member, and a cap detachably engaged with the said threaded extended portion of the second named member.

In testimony whereof I affix my signature in presence of two witnesses.

CHESLEY JOICE.

Witnesses:
G. W. McCONNELL,
JOHN WELCH.

Copies of this patent may be obtained for five cents each, by addressing the "Commissioner of Patents, Washington, D. C."